(12) United States Patent
Bohn

(10) Patent No.: US 6,431,599 B1
(45) Date of Patent: Aug. 13, 2002

(54) GAS BAG MODULE

(75) Inventor: Stefan Bohn, Goldbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 10/035,938

(22) Filed: Dec. 26, 2001

(30) Foreign Application Priority Data

Dec. 28, 2000 (DE) .................................. 200 22 016 U

(51) Int. Cl.⁷ ............................................... B60R 21/16
(52) U.S. Cl. ................................. 280/743.1; 280/743.2
(58) Field of Search .......................... 280/743.1, 743.2, 280/731, 732, 729

(56) References Cited

U.S. PATENT DOCUMENTS 3,618,979 A * 11/1971 Gulette
4,828,286 A * 5/1989 Fohl ............................ 280/731
5,125,682 A * 6/1992 Hensler et al. .............. 280/731

* cited by examiner

*Primary Examiner*—Eric Culbreth
(74) *Attorney, Agent, or Firm*—Tarolli, Sundheim, Covell, Tummino & Szabo L.L.P.

(57) ABSTRACT

The invention relates to a gas bag module comprising a gas bag, an outer contour of the gas bag being defined by a gas bag wall which has a front wall for the impact of an occupant with a centric opening as a transition to an indentation in the gas bag. The indentation is formed in that during inflation a center portion of the gas bag wall is prevented from freely moving and is restrained. A closure part is provided which encloses one of the indentation and the opening and engages the gas bag wall. A traction device is provided which is connected with the closure part. The traction device is attached such that due to a deployment of the gas bag a tensile force is exerted on the traction device and the tensile force is passed on to the closure part, and one of the indentation and the opening is at least partly closed.

7 Claims, 1 Drawing Sheet

GAS BAG MODULE

This invention relates to a gas bag module comprising a gas bag.

BACKGROUND OF THE INVENTION

There are gas bags in which an outer contour of the gas bag is defined by a gas bag wall which has a front wall for the impact of the occupant with a centric opening as a transition to an indentation in the gas bag, the indentation being formed in that during inflation a center portion of the gas bag wall is prevented from freely moving and is restrained. In such ring-shaped gas bags, the center portion which in a conventional gas bag is presented to the occupant, is prevented from moving towards the occupant in that it remains fixedly attached to the module. In this arrangement, restraint is effected via the ring-shaped front wall around the indentation. The indentation which is not filled with gas is to be as small as possible so as to help the head of the occupant to be intercepted as safe as possible.

BRIEF SUMMARY OF THE INVENTION

The invention provides a gas bag module in which the indentation is closed at least in part, preferably even completely closed. This is achieved in a gas bag module which comprises a gas bag, an outer contour of the gas bag being defined by a gas bag wall which has a front wall for the impact of an occupant with a centric opening as a transition to an indentation in the gas bag. The indentation is formed in that during inflation a center portion of the gas bag wall is prevented from a free movement, preferably from any movement, and is restrained. A closure part is provided which encloses one of the indentation and the opening and engages the gas bag wall. A traction means is connected with the closure part. The traction means is attached such that due to a deployment of the gas bag a tensile force is exerted on the traction means and the tensile force is passed on to the closure part, and one of the indentation and the opening is at least partly closed.

In the gas bag module according to the invention a closure part is provided preferably in the region of the transition from the front wall to the indentation (i.e. the opening), or in the region of the indentation and as close as possible to the front wall, which closure part is actuated by the traction means and at least largely closes the opening or the indentation. The closing force is generated by the gas bag itself during the process of deployment. The opening in the front wall or the indentation thus has a much smaller open cross-sectional area than in the case of a gas bag formed without closure part and without traction means, but otherwise is formed identically.

Preferably, the traction means is on the one hand connected to the gas bag wall and on the other hand to the closure part. The gas bag wall is displaced during deployment, so that the traction means is moved relative to the gas bag wall, whereby the tensile force required for actuating the closure part is produced.

In the completely inflated condition of the gas bag, the traction means preferably runs obliquely outwards, i.e. sidewards, to a lateral portion of the gas bag wall to which it is attached. This formation ensures that the traction means does not produce any recess or indentation in the region of the opening, when the traction means would act as a limiting strap.

The traction means may be arranged outside the gas bag, so as to extend along the gas bag wall, or in accordance with the preferred embodiment in the interior of the gas bag, i.e. within the chamber to be inflated, whereby a relatively plain outside wall is available for the occupant for restraint purposes.

The closure part preferably is a strap or rope surrounding the indentation or the opening.

Furthermore, a guideway is preferably provided in the gas bag wall, in which guideway the closure part is accommodated so as to be movable with respect to the gas bag wall, similar to a bag the opening edge of which has been folded over and sewn, so that the bag can be pulled tight by means of a rope accommodated therein.

Preferably, closure part and traction means are made in one piece, preferably as a strap or a rope.

DETAILED DESCRIPTION OF THE PREFERRED EMBODIMENT

Figure 1:
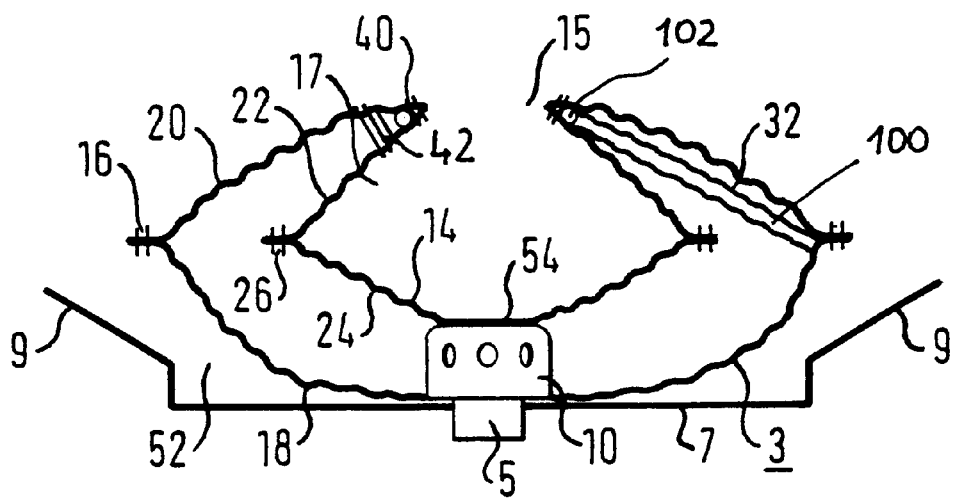
FIG. 1 shows a cross-sectional view of an embodiment of the gas bag module according to the invention, with the gas bag not yet completely inflated.

FIG. 1 shows a gas bag module which has a gas bag 3, a gas generator 5 and a module housing 7 with a module cover 9 in the form of flaps. The gas generator 5 is surrounded by a pot-shaped or bell-shaped diffuser 10, which has been put over the gas generator from above and is attached to the module, more precisely to the module housing 7. Instead of the diffuser 10 any other component surrounding the gas generator 5 and firmly attached to the module may be provided.

The gas bag, which is a front gas bag arranged in the steering wheel or in the dashboard, has a gas bag wall which consists of several portions. One of these portions is the front wall 11, which faces the occupant in the inflated condition (FIG. 2), and which the same can impact upon in the case of restraint. Moreover, a surrounding lateral portion 12 and a rear wall 13 are provided. The front wall has a centric opening 15, from which the gas bag wall extends towards inside, to the diffuser 10, so that a deep indentation is formed which usually is open from the outside and is provided with the reference numeral 17. The gas bag wall defining the indentation is designated with the reference numeral 14. The opening 15 defines a transition from the front wall 11 to the indentation 17.

Usually, the gas bag consists of various fabric parts, namely two outer, ring-shaped fabric parts 18 and 20 sewn by means of the surrounding seam 16 as well as two inner fabric parts 22, 24, which are connected with each other at the surrounding seam 26, the fabric part 22 being sewn to the fabric part 20 at the edge of the opening 15.

The indentation 17 is formed in that the lowermost part (center portion 54) of the fabric part 24 is permanently attached to the diffuser 10 and in the case of restraint, during inflation, is prevented from moving towards outside.

By means of the indentation 17 a ring-shaped chamber 30 to be filled with gas is obtained. The indentation 17 is not to be filled with the gas of the gas generator.

In the interior of the chamber 30 a rope or pull strap 32 is disposed, which with its free ends is disposed between the fabric layers 18, 20 and is attached to the gas bag wall by the seam 16. The pull strap is thus attached to the lateral portion 12 of the gas bag wall. In the completely inflated condition, it obliquely extends upwards towards the opening 15, where it extends around the edge of the opening 15 and is accommodated in a guideway in the gas bag wall in the region of the edge of the opening 15 so as to be movable with respect to the gas bag wall, similar to a closure rope sewn in at the edge of a bag. The guideway is formed in that on the radially inner side a first connecting seam 40 is provided, by means of which the fabric layers 20, 22 are sewn. Radially spaced from this seam 40 a second seam 42 extends around the opening, and this seam is not closed completely in the circumferential direction, so that the pull strap 32 can get out of the guideway.

The portion of the pull strap 32, which extends outside the guideway, is referred to as traction means 100, and the portion inside the guideway circumscribing the opening 15 is referred to as closure part 102.

In the case of restraint, the gas bag module operates as follows: Via the gas generator 5, gas is introduced into the chamber 30, so that the gas bag being deployed urges the cover 9 towards outside. There is obtained a ring-shaped outlet opening 52 through which the gas bag can leave the module. There is not shown a circular middle part of the cover, which rests against the center portion 54 above the same and is permanently attached to the diffuser 10, so that it does not swivel towards outside when the cover 9 is opened.

Figure 2:
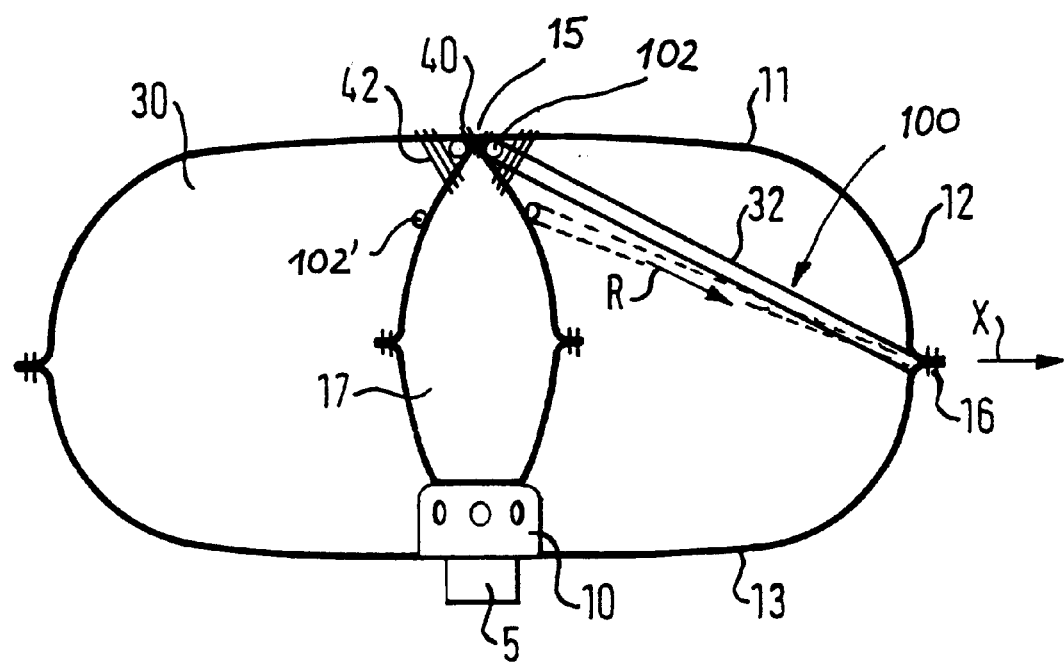
FIG. 2 shows a cross-section through the gas bag module as shown in FIG. 1 with the gas bag almost completely inflated.

The gas bag is deployed further towards the occupant, the ring-shaped front wall 11 moving towards the occupant more and more, but still having a large opening 15. Due to the fact that the pull strap 32 bridges a longer portion of the gas bag wall, a tensile force is exerted on the pull strap 32, for instance because the lateral portion 12 of the gas bag wall tends to further bulge towards outside in the direction X. Due to the tensile force, the pull strap 32 is displaced in the direction of the arrow R and completely or almost completely pulls tight the opening 15, as this is represented in FIG. 2.

The occupant thus faces an almost or even completely closed front wall 11.

The pull strap 32 might also be disposed outside the chamber 30 and be displaced by the gas bag wall bulging towards outside, so as to achieve the closure of the opening 15. Moreover, there might also be provided two or more catch straps oppositely disposed at the indentation 17, to provide the gas bag with a symmetrical shape.

The closure part 102 need not loop around the opening directly at the transition from the front wall 11 to the indentation 17, for it might also surround the fabric part 22 for instance in the uppermost third of the indentation (see closure part 102' shown in broken lines in FIG. 2) and in that way close the indentation in the region of the opening 15.

What is claimed is:

1. A gas bag module comprising:

a gas bag, an outer contour of said gas bag being defined by a gas bag wall which has a front wall for the impact of an occupant with a centric opening as a transition to an indentation in said gas bag, said indentation being formed in that during inflation a center portion of said gas bag wall is prevented from freely moving and is restrained, a closure part which encloses one of said indentation and said opening and engages said gas bag wall, and a traction means being provided which is connected with said closure part, said traction means being attached such that due to a deployment of said gas bag a tensile force is exerted on said traction means and said tensile force is passed on to said closure part, and one of said indentation and said opening being at least partly closed.

2. The gas bag module as claimed in claim 1, wherein said traction means is on the one hand connected to said gas bag wall and on the other hand to said closure part.

3. The gas bag module as claimed in claim 1, wherein in a completely inflated condition of said gas bag said traction means runs obliquely outwards to a lateral portion of said gas bag wall, said traction means being attached to said lateral portion.

4. The gas bag module as claimed in claim 1, wherein said traction means is disposed in an interior of said gas bag.

5. The gas bag module as claimed in claim 1, wherein said closure part is one of a strap and a rope surrounding one of said indentation and said opening.

6. The gas bag module as claimed in claim 1, wherein said closure part is accommodated in a guideway provided in said gas bag wall so as to be movable with respect to said gas bag wall.

7. The gas bag module as claimed in claim 1, wherein said closure part and said traction means are integrally connected with each other.

* * * * *